No. 802,385. PATENTED OCT. 24, 1905.
C. F. FOGG.
CHEESE CUTTER.
APPLICATION FILED JULY 20, 1904.
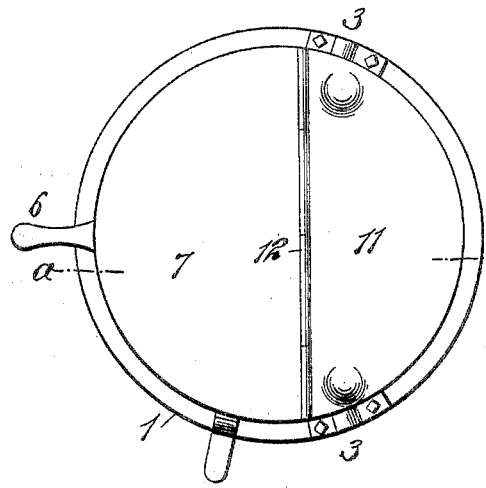
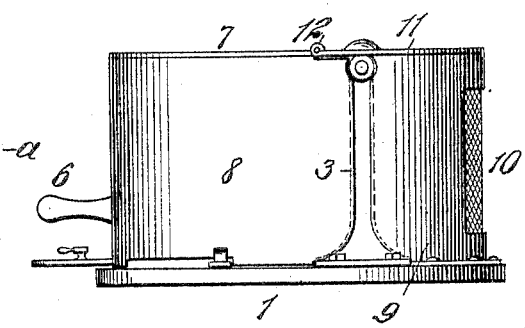
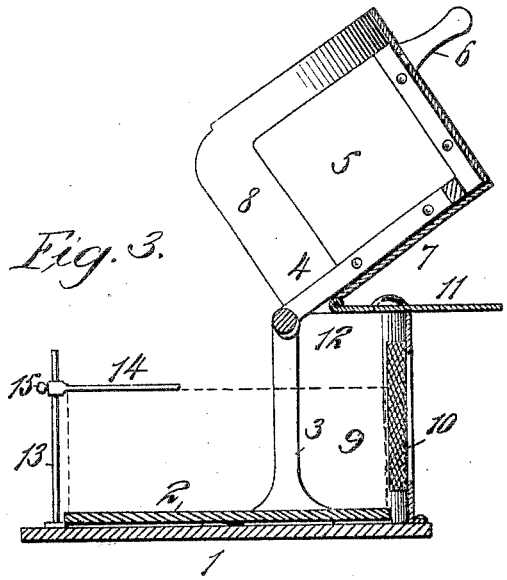
Witnesses
Charles F. Fogg, Inventor
By his Attorney A. M. Pierce

UNITED STATES PATENT OFFICE.

CHARLES F. FOGG, OF NEW YORK, N. Y., ASSIGNOR OF ONE-HALF TO TIMOTHY C. WOODIN, OF NEW YORK, N. Y.

CHEESE-CUTTER.

No. 802,385. Specification of Letters Patent. Patented Oct. 24, 1905.

Application filed July 20, 1904. Serial No. 217,332.

*To all whom it may concern:*

Be it known that I, CHARLES F. FOGG, a citizen of the United States, residing at New York, in the county of New York and State of New York, have invented certain new and useful Improvements in Cheese-Cutters, of which the following is a specification, reference being had therein to the accompanying drawings.

My invention relates especially to devices employed for cutting cheeses into portions, and has for its object the provision of a cheap, simple, and effective cover for protecting an inclosed cheese from insects, &c.

To attain the desired end, my invention consists, essentially, in the combination, with a cheese-knife or cutting device, of a cover or casing carried by the cutting mechanism and arranged to move therewith; and my invention also involves certain novel and useful combinations or arrangements of parts and peculiarities of construction and operation, all of which will be hereinafter first fully described and then pointed out in the claims.

In the drawings, Figure 1 is a plan view of a cheese-cutter embodying my invention, and Fig. 2 is a side elevation thereof. Fig. 3 is a vertical sectional view at line $a\ a$ of Fig. 1, the knife or cutting mechanism being thrown back.

Like numerals of reference wherever they occur indicate corresponding parts in all the figures.

1 is a base-piece provided with a turn-table 2 for the support of a cheese.

3 3 are standards secured to the base 1 at each side thereof. In the standards 3 is journaled a frame 4, carrying a knife 5, provided with an operating-handle 6.

7 is one portion of the top of the cover or casing, having a depending skirt 8, which extends to the base 1, as particularly indicated in Fig. 2 of the drawings. The top piece 7 and skirt 8 are carried by and arranged to move with the knife-frame 4.

9 is a vertical inclosing wall secured to the base 1 and provided with a ventilating opening covered by wire-gauze 10. Resting on the top of the wall 9 is a portion 11 of the inclosing top or cover, hinged at 12 to the portion 7.

13 is a standard fixed to the base 1 and bearing a horizontal arm 14, adjustably held on the standard by a set-screw 15. The object of this arm is to hold the cut piece of cheese from being carried upward when the knife is raised, by reason of its adhesion thereto, when a slice is severed from the body of the cheese.

When a cheese is placed on the turn-table 2 and the holding-arm 14 is adjusted to rest thereon, the parts of the cover and cutting device are in the position shown in Fig. 3 of the drawings, the portion 11 of the top sliding back on the top of the wall 9. By means of the handle 6 the knife is forced through the cheese, the parts of the cover or casing carried by the cutting mechanism assuming the position shown in Figs. 1 and 2 of the drawings, the part 11 sliding into place, completely inclosing the cheese, the act of opening and closing the cover being entirely controlled by the movements of the cutting mechanism.

Having now fully described my invention, what I claim as new therein, and desire to secure by Letters Patent, is—

1. In a device of the character herein specified, the combination with a base a knife carried by a pivoted frame. and a pivoted frame, of a cover having a divided, hinged top connected to the knife and frame, and arranged to move therewith, substantially as shown and described.

2. In a device of the character herein specified, a cover the top whereof is formed in two parts, hinged together, one of said parts being fixed to the cutting mechanism and moving therewith, and the other part arranged to slide horizontally, cutting mechanism, and a supporting-base, substantially as shown and described.

3. In a device of the character herein specified, the combination of a base provided with standards; cutting mechanism pivoted in said standards; a top piece and depending skirt secured to the cutting mechanism; a fixed wall mounted on the base, and a horizontally-movable cover portion hinged to the first-named cover portion, and resting on the fixed vertical wall, substantially as shown and described.

In testimony whereof I affix my signature in presence of two witnesses.

CHARLES F. FOGG.

Witnesses:
  A. M. PIERCE,
  GEO. W. DISCH.